Jan. 19, 1971     R. J. ZEBB     3,555,648

REPAIR ANVIL

Filed Dec. 4, 1968

INVENTOR.
Rhinhold J. Zeeb
BY
ATTORNEY 3,555,648
REPAIR ANVIL
Rhinhold J. Zeeb, Lesterville, S. Dak. 57040
Filed Dec. 4, 1968, Ser. No. 780,968
Int. Cl. B23p 19/00
U.S. Cl. 29—200                                    7 Claims

ABSTRACT OF THE DISCLOSURE

A portable repair anvil for the parts of a cutter bar assembly comprising a block provided with a novel arrangement of slots and channels which serve as receptacles for parts of the cutter bar assembly for repair thereof. The block has broad flat external faces which give firm support while disposing a selected one of the receptacles in a stable upright manner during parts repair and hammering thereon.

---

This invention relates to repair devices and more particularly for use in repairing and replacing the several parts of a mower cutter bar assembly.

The mower used for cutting grass and grain is one of the most commonly used farm implements. In order to maintain proper cutting action by the cutter bar assembly the parts or elements must be in good condition and correctly set. Frequently it becomes necessary to remove and replace worn or broken knife sections or ledger plates in order to maintain proper cutting action and it is a great advantage to be able to perform such repairs and replacements in the field in order to save time and repair costs. Some hand anvils have heretofore been provided for the purpose of repairing a cutter blade assembly but these have not been entirely satisfactory for all repair requirements.

Accordingly it is an object of this invention to provide a novel and improved portable repair anvil for the cutter bar assembly of a mower.

Another object of this invention is to provide a novel and improved repair anvil which is lightweight and compact in construction and may be formed by die casting with broad flat surfaces to give firm support of parts during repair and hammering thereon.

Yet another object of this invention is to provide a portable repair anvil which has parts receiving receptacles on more than one face thereof to provide for several repair functions on a single block.

In accordance with the present invention there is provided a generally lightweight and compact repair anvil in the form of a generally hollow block of essentially oblong shape having several parts receiving receptacle portions generally arranged at right angles to one another which may be hand carried to the field for cutter bar assembly repairs. This block has a receptacle portion for replacement of knife sections without removing the knife assembly from the cutter bar and the removal and replacement of ledger plates. The block has wall portions at right angles to one another to distribute the load throughout and relatively broad flat faces which provide firm support for each of the several receptacle portions when the block is disposed on one of its several support faces.

Other objects, advantages and capabilities of the present invention will become more apparent as the description proceeds taken in conjunction with the accompanying drawings, in which.

Figure 1:
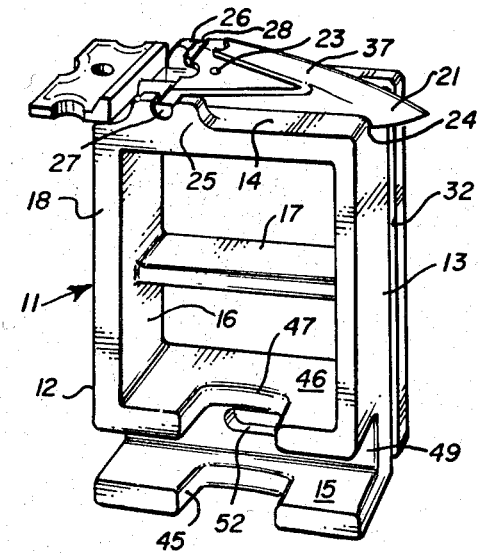
FIG. 1 is a perspective view of the repair anvil embodying features of the present invention being disposed on one end wall in an upright manner having a mower guard supported on the receptacle portion formed on its other end wall.
Figure 2:
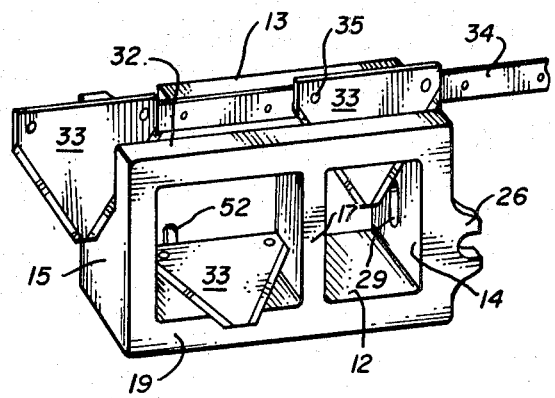
FIG. 2 is a perspective view of the repair anvil shown in FIG. 1 being disposed on a side wall shown as having a knife assembly supported thereon with one of the knife sections shown as being removed from the associated knife bar.

Referring now to the drawings, the anvil shown comprises a body or block 11 of essentially oblong shape formed of opposing side walls 12 and 13 and opposing end walls 14 and 15 generally perpendicular to the side walls to define a central cavity or recess 16 which makes the block of a generally hollow construction. The block is generally divided across its width by a partition member 17 interconnected between the side walls 12 and 13 for added strength. The top and bottom faces 18 and 19 of the block are essentially flat and smooth as are the outer surfaces of the wall so that they provide broad bases and afford firm support for the repairing and hammering of cutter bar assembly parts disposed thereon. The partition member 17 as shown in flush with the bottom face 19 and inset from the top face 18. The flat outer surfaces of the block permit the disposing of one of the several parts-receiving receptacles in an upright position for receiving and firmly supporting the parts of the cutter bar assembly in a manner to be described.

The block is shown in FIG. 1 as disposed in an upright position on end wall 15 and the opposite end wall 14 and has a receptacle portion formed on an outer surface thereof for supporting a mower guard 21 provided with a ledger plate 22 secured thereto by a rivet 23. The end wall 14 has a shallow tapered channed or groove 24, shaped to receive the curved undersurface of the guard and support same, and upstanding sections 25 and 26 on each side of the guard are provided with open transverse slots to receive and support the side wings 27 and 28 of the guard. An aperture 29 is formed in the end wall 14 below the groove 24 and opening into cavity 16 through which the rivet 23 is driven for removal of the ledger plate 22.

Another receptacle portion is formed in the side wall 13 which includes a narrow slot 32 in the wall 13 opening through the end walls 14 and 15 and into the cavity 16. This slot is shaped to slidably receive a portion of the knife assembly which comprises a plurality of knife sections 33 arranged in a side-by-side relation on a knife bar 34 and held thereon by rivets 35. When the knife assembly is inserted edgewise in slot 32 the knife sections are firmly supported by the adjoining surfaces of the block in a manner so that the rivets may be quickly and easily knocked out for removal of the knife sections from the bar. A removed knife section is shown as having fallen through the slot 13 and into the central cavity 16. Side wall 13 is provided with a tapered undercut surface portion 36 along its inner surface into which the lip 37 of a mower guard is inserted to permit the guard to be placed in an inverted position on the outer surface of side wall 13. In this position a rivet 38 may be hammered against wall 13 to secure a new ledger plate to the guard.

Figure 4:
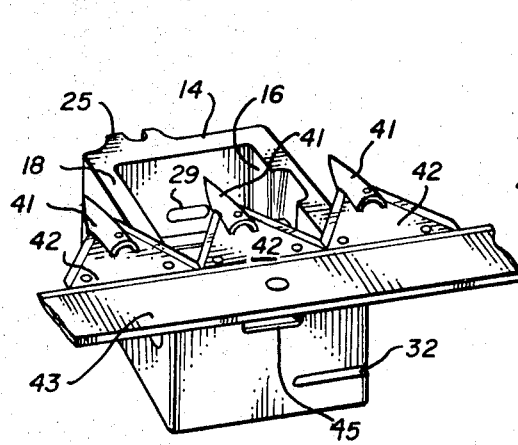
FIG. 4 is a perspective view of a repair anvil disposed on its bottom face and having a cutter bar assembly supported on the top of the block representing its repair while mounted on the vehicle.
Figure 3:
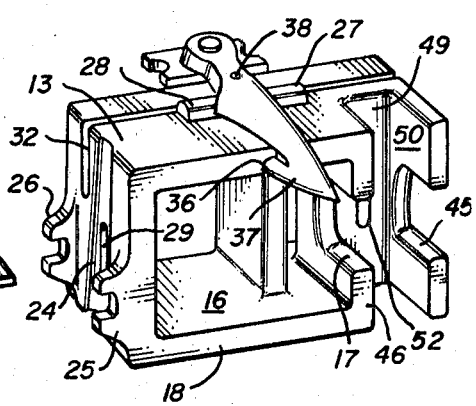
FIG. 3 is a perspective view of the repair anvil as viewed looking toward its bottom face showing a mower guard supported thereon for the replacement of a rivet holding a ledger plate to the guard.
Figure 5:
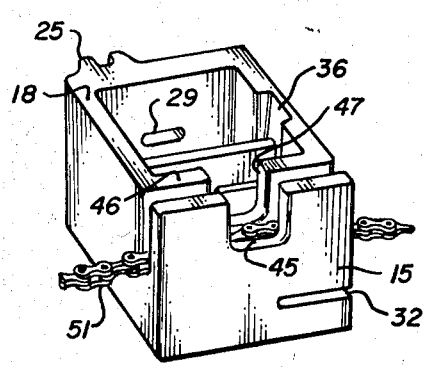
FIG. 5 is a perspective view of the anvil as shown in FIG. 4 with a chain being disposed in position for its repair.

The block is shown in FIG. 4 as disposed on the bottom face 19 and a short stretch of cutter bar assembly is shown as being supported on the top face 18. The height of the block is dimensioned so that it will easily slide under a cutter bar assembly while mounted on a vehicle which carries it during the mowing operation such as a tractor or the like. FIG. 4 shows that the cutter bar assembly has three guards 41 and three knife sections 42 supported on the cutter bar 43 with the entire assembly being supported on the top face 18 of the block. A relatively wide slot or channel 45 is formed in the end wall 15 and another slot or channel 47 is formed in wall 46 inwardly of end wall 15 aligned with the slot 45. The slots 45 and 47 define with the adjacent cavity 16 a channel section or recess for receiving the guard 41 mounted on the cutter bar 43. The end wall 15 and inner wall portion 46 together with an intermediate wall portion 49 form a transverse channel designated 50 which is generally perpendicular to the longitudinal channel section. The central knife section 42 is disposed centrally of the recess with the guard 42 being in the slotted portions 45 and 47, and adjacent knife sections are seated on the top face 18. The rivets in the intermediate knife section 42 may then be driven downwardly into the transverse channel for the removal of the knife section without having the entire knife assembly removed from the cutter bar assembly. The transverse channel 50 also functions as a support for the repair of a roller chain 51 shown in FIG. 5 as placed in the transverse channel 50 on the bottom portion 49. An opening 52 is provided in bottom wall 49 through which the chain rivets may be driven, the bottom wall portion 49 providing a surface on which the rivets may be crimped when disposed in when disposed in the channel as shown in FIG. 5.

The above described anvil when formed as an integral block by the die casting of ductile alloys has been found to be extremely strong and provides a firm support for parts repair and hammering thereon. The block so formed is compact and lightweight and permits easy grasping by one hand and carried to the cutter bar assembly as for example when in use in the field for fast and effective repairing of the parts of a cutter bar assembly.

Although the present invention has been described with a certain degree of particularity, it is understood that the present disclosure has been made only by way of example and that changes in details of structure and system components may be made without departing from the spirit thereof.

What is claimed is:

1. A portable repair anvil for a cutter bar assembly comprising a body having a first receptacle portion for supporting a cutter bar assembly to remove a selected knife section from the assembly, said first receptacle portion provided with a recess through which a rivet securing the knife section to the assembly is driven, a second receptacle portion formed at right angles to said first receptacle portion for supporting a knife assembly to remove knife sections therefrom, and a third receptacle portion disposed at right angles to said first and second receptacle portions for supporting a guard and including an opening through which a rivet securing a ledger plate to the guard is driven for the removal of the ledger plate from the guard.

2. A portable repair anvil as set forth in claim 1 wherein said first receptacle portion includes a pair of interportion divided by an intermediate partition member.

3. A portable repair anvil as set forth in claim 1 wherein said first receptacle portion includes a pair of intersecting channel sections formed in an essentially flat top face.

4. A portable repair anvil as set forth in claim 1 wherein said third receptacle portion includes a tapered groove formed in an outer end wall of the block to receive and support the bottom of a guard and upstanding slotted portions on each side of the grooves shaped to receive and support the side wings of the guard.

5. A portable repair anvil for a mower cutter bar assembly comprising a hollow block of essentially oblong shape formed of opposing side walls and opposing end walls generally perpendicular to the side walls to define a central cavity and having essentially a flat top and flat bottom face, said block including a portion defining with one of the end walls a longitudinal channel into which a guard of the assembly fits when a length of the assembly is disposed on a portion of the top face of the block and a transverse channel intersecting said longitudinal channel through which the rivet is driven from a supported knife section for the removal of the knife section.

6. A portable repair anvil for a mower cutter bar assembly having a series of guards mounted on a cutter bar and wherein each guard is provided with a ledger plate riveted thereto and a knife blade movably supported on the guards together with a series of knife sections riveted on a knife bar, said repair anvil comprising a hollow block of essentially oblong shape formed of opposing side walls and opposing end walls generally perpendicular to the side walls to define a central cavity and having essentially a flat top and flat bottom faces, said block including a portion defining with one of the end walls a longitudinal channel into which a guard of the assembly fits when a length of the assembly is disposed on a portion of the top face of the block and a transverse channel intersecting said longitudinal channel through which the rivet is driven from a supported knife section for the removal of the knife section, said block having a shallow, tapered groove formed in the other end wall to receive and support the bottom of a guard, and upstanding channel portion on each side of the groove shaped to receive and support the side wings of the guard and an opening under the groove extending into the cavity through which the rivets on a ledger plate are driven for the removal of the ledger plate from the guard, said block having a narrow slot in one side wall opening through the end walls and into said cavity to receive and support knife blades for the removal of knife sections from the knife bar, and an undercut portion formed on an inner side of one side wall into which the lip of a guard may be slidably inserted to support the guard on the outer surface of said side wall in an inverted position to rivet a replacement ledger plate on the guard.

7. A portable repair anvil as set forth in claim 6 wherein said transverse channel has a bottom opening through which the rivets of a roller chain are driven for the repair thereof.

References Cited

UNITED STATES PATENTS 3,349,603  10/1967  Lovig _____ 29—200X

JAMES M. MEISTER, Primary Examiner